United States Patent
Morselli

(10) Patent No.: US 6,827,480 B2
(45) Date of Patent: Dec. 7, 2004

(54) DEVICE FOR CONTROLLING THE CLAMPING OF A CONTAINER IN A MIXER FOR FLUID PRODUCTS

(75) Inventor: Emanuele Morselli, Modena (IT)

(73) Assignee: Corob S.p.A., Modena (IT)

( * ) Notice: Subject to any disclaimer, the term of this patent is extended or adjusted under 35 U.S.C. 154(b) by 6 days.

(21) Appl. No.: 10/332,678

(22) PCT Filed: Jul. 12, 2001

(86) PCT No.: PCT/IB01/01246

§ 371 (c)(1),
(2), (4) Date: Jan. 13, 2003

(87) PCT Pub. No.: WO02/04108

PCT Pub. Date: Jan. 17, 2002

(65) Prior Publication Data

US 2004/0100863 A1 May 27, 2004

(51) Int. Cl.[7] .............................................. B01F 11/00
(52) U.S. Cl. ..................................................... 366/209
(58) Field of Search ........................ 366/110–111, 114, 366/208–211, 219, 605

(56) References Cited

U.S. PATENT DOCUMENTS

| | | | | |
|---|---|---|---|---|
| 3,589,182 A | * | 6/1971 | Burgett ......................... | 73/146 |
| 4,134,689 A | * | 1/1979 | Ahrenskou-Sorensen ... | 366/110 |
| 4,135,915 A | * | 1/1979 | Kennard ....................... | 75/386 |
| 4,842,415 A | * | 6/1989 | Cane et al. .................. | 366/110 |
| 5,066,136 A | * | 11/1991 | Johnson ....................... | 366/209 |
| 5,268,620 A | * | 12/1993 | Hellenberg .................. | 318/114 |
| 5,360,195 A | * | 11/1994 | Young .......................... | 248/550 |
| 5,662,416 A | * | 9/1997 | Dwigans, II ................. | 366/209 |
| 5,904,421 A | * | 5/1999 | Mazzalveri .................. | 366/213 |
| 6,105,343 A | * | 8/2000 | Grove et al. ................. | 53/490 |
| 6,141,888 A | * | 11/2000 | Cammarata ................... | 34/536 |
| 2001/0037122 A1 | * | 11/2001 | Farris et al. ................. | 606/166 |
| 2002/0097039 A1 | * | 7/2002 | Khuri-Yakub et al. ........ | 324/95 |
| 2004/0008573 A1 | * | 1/2004 | MacDonald et al. | |
| 2004/0013031 A1 | * | 1/2004 | Salas et al. .................. | 366/141 |

FOREIGN PATENT DOCUMENTS

| | | |
|---|---|---|
| DE | 23 60 203 A | 6/1975 |
| EP | 0 317 112 A | 5/1989 |
| EP | 0 680 778 A | 11/1995 |

* cited by examiner

Primary Examiner—Charles E. Cooley
(74) Attorney, Agent, or Firm—Sughrue Mion, PLLC

(57) ABSTRACT

In a mixer for fluids, of the type including at least one clamping assembly (1) operable selectively for clamping, in use, a container of fluid products, a device is provided for controlling the clamping of the container which includes a sensor (8) mounted on the clamping assembly (1). The sensor (8) is disposed in a region of the clamping assembly (4) subjected, in use, to a force in a predetermined direction due to the compressive forces exerted on the container in the clamping state. The sensor (8) is further adapted to emit a continuous signal proportional to the force.

6 Claims, 2 Drawing Sheets

DEVICE FOR CONTROLLING THE CLAMPING OF A CONTAINER IN A MIXER FOR FLUID PRODUCTS

This is a National Stage Entry of Application No. PCT/IB01/01246 filed Jul. 12, 2001; the disclosure of which is incorporated herein by reference.

BACKGROUND OF THE INVENTION

The present invention relates to the field of mixers for fluid products such as, for example, paints, varnishes, enamels and the like, placed inside closed containers such as, for example, cans, pots or drums, with particular reference to a device for controlling the clamping of such containers on mixers of the type indicated above.

Mixers of known type for fluid products generally comprise assemblies for supporting and clamping containers, provided with a pair of plates disposed opposite each other, each or both of which plates are selectively movable towards and away from each other by means of a mechanical transmission operated by an electric motor. The specific technical characteristics of a known support assembly vary according to the type and model of mixer on which the aforesaid support assembly is mounted, and in particular according to the mixing motion imparted, in use, to the container, whether it be a gyroscopic, rotatory, shaking or vibratory motion, or a combination of rotatory and vibratory motion.

Specific types of support assemblies for mixers for fluid products are illustrated in documents EP-0617998, EP-0680778 and EP-0706820 of the same Applicant.

In methods for mixing fluid products, the containers are first clamped between the pair of plates and then subjected to a motion of the type indicated above, such that the various fluid product components are thoroughly amalgamated with one another. Because the containers filled with fluid product may be of considerable dimensions and weight, it is clear that during mixing they may exert thrusts and inertial forces on the clamping plates such as to cause them to be accidentally opened or loosened. For this reason the clamping force of the plates on the container should be sufficiently high to withstand the dynamic thrusts which are generated during the mixing phases, and at the same time it cannot be increased arbitrarily, in order to avoid the risk of crushing the containers of smaller dimensions, used in the case where small amounts of fluid products are to be mixed.

U.S. Pat. No. 5,268,620 describes a system for controlling the clamping force of the plates in a clamping assembly for a mixer for fluid products, in which the current absorbed by the electric motor which controls the rotation of screws for operating the plates between which the container of fluid products is clamped is detected and measured. The principal drawback of such a system lies in the fact that the current absorbed by the electric motor also depends on factors other than the effective clamping force exerted by the plates on the container. For example, in the case where—as frequently occurs in practice—the screws for operating the clamping plates become dirty, a greater force is necessary to move the plates and overcome the higher friction compared with the situation in which the screws are perfectly clean and lubricated. The greater amount of current that the electric motor must therefore absorb in the first case interferes with the measurement of the force effectively exerted by the clamping plates and could lead to false indications, erroneously signalling that a clamping force sufficient for clamping the plates on the container has been obtained.

SUMMARY OF THE INVENTION

An aim of the present invention is that of providing an effective device for guaranteeing continuous measurement, or measurement at any time, during any operating state of the mixer, and therefore also during the mixing phases, proportional to the intensity of the forces applied to the container of fluid product by the support assembly.

A further aim of the invention is that of providing such a device which is simple, economic, reliable over time, and simple to manufacture, assemble and maintain.

In order to fulfil the aims indicated above, the subject of the invention is a device of the type indicated in the preamble of the present description, characterised in that it comprises sensor means mounted on the clamping assembly, the sensor means being disposed in a region of the clamping assembly subjected, in use, to an effort in a predetermined direction due to the compressive forces exerted on the container, the sensors being further adapted to emit a continuous signal proportional to said effort.

As will become clearer hereinafter, one of the principal advantages of the present invention lies in the continuous measurement of the signal emitted by the sensor means which allows repeatable control of said measurement such as to detect, and above all correct, any errors of measurement.

A further advantage of the present invention lies in the continuous measurement of the stress forces exerted by the support assembly for monitoring the correct operation of the device also during the mixing phases.

BRIEF DESCRIPTION OF THE DRAWINGS

Further characteristics and advantages will become clear from the following description of a preferred embodiment with reference to the appended drawings, provided by way of non-limiting example, in which.

DETAILED DESCRIPTION OF THE INVENTION

Figure 1:
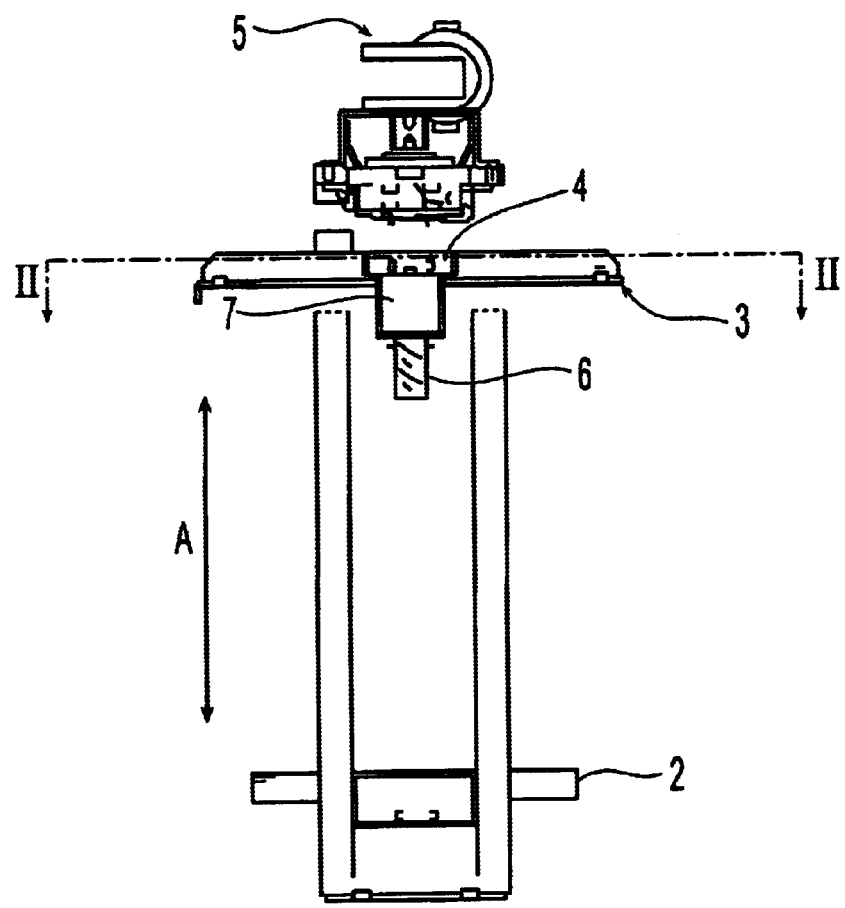
FIG. 1 is a longitudinal section through a container clamping assembly for a mixer, illustrating an embodiment of the present invention.

With reference now to the drawings, a mixer of known type comprises a clamping assembly 1 adapted to clamp a container of fluid products between a lower support plate 2 and an upper pressure plate 3 which are movable relative to each other. In the example shown in the drawings, the lower plate 2 is fixed, while the upper plate 3 is fixed to a cross-member 4 movable in the direction of the arrows A. The system for moving the cross-member 4, and therefore the upper plate 3, is widely known and will not therefore be discussed in detail. It is sufficient to mention the fact that a motor unit 5, mounted on the mixer, is mechanically coupled, for example by means of threaded operating rods 6 and corresponding threaded bushes 7, to the cross-member 4 and can therefore be actuated selectively, in use, to control the descent or the rise of the upper plate 3 according to the arrows A.

Figure 2:
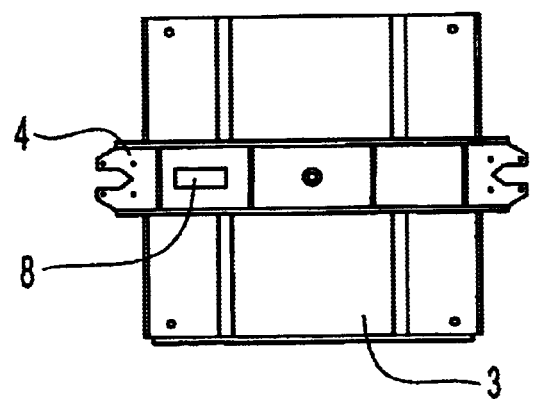
FIG. 2 is a section along the line II—II in FIG. 1.
Figure 3:
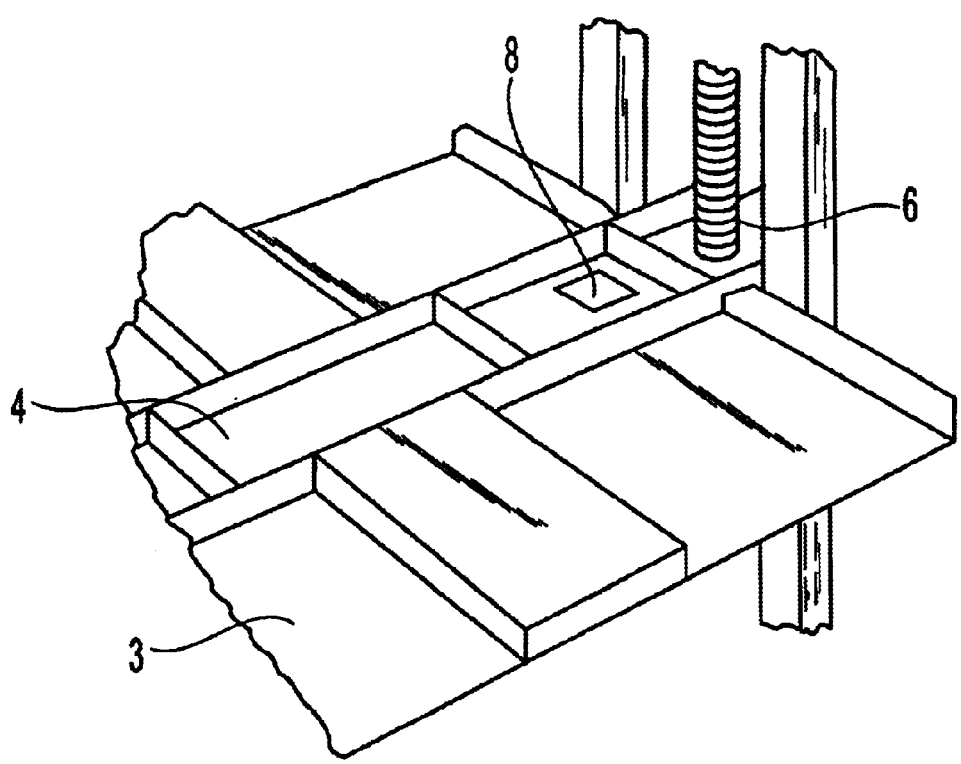
FIG. 3 is a partial perspective view of a detail of the upper clamping plate.
Figure 4:
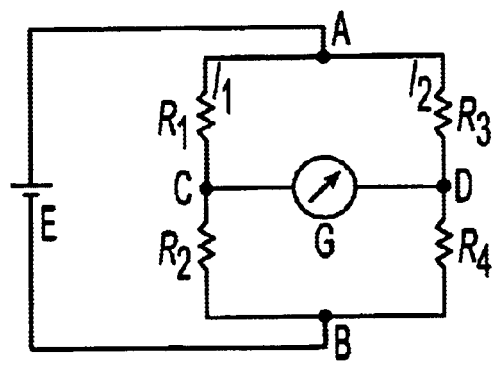
FIG. 4 is an electrical circuit diagram representing a Wheatstone bridge.

The clamping assembly 1 illustrated in FIGS. 1 and 2 is adapted for use on mixers of the shaker or vibratory type, but the characteristics of the invention which are described hereinafter with reference to the particular embodiment illustrated may, of course, be adapted, with very slight variations, also to a clamping assembly for mixers of another type, for example to a clamping assembly in which both the lower and upper plate are movable, as commonly provided for in mixers of the gyroscopic type, or wherein one plate is simultaneously movable and rotatable about a vertical axis, as in the mixers described in documents EP-0617998 and EP-0706820 of the same Applicant.

As can be seen in the drawings, the movable cross-member 4 comprises on its upper face a sensor 8, preferably, but not limitatively, a strain gauge disposed in the longitudinal direction of the movable cross-member 4. The strain gauge 8 is connected to an electronic control circuit (not illustrated) of the type commonly used on mixers for general control of their operation. The arrangement and the number of strain gauges 8 on the cross-member 4 illustrated in the drawings are provided purely by way of non-limiting example, it being possible to position one or more sensors 8 in different positions, for example at the centre, according to the points of maximum flexural load determined by experimental tests, and so that the aims and advantages of the present invention can still be fulfilled.

In the example shown in the drawings, the electrical connection of the strain gauge 8, mounted on the movable cross-member 4, to the electronic circuit, mounted on the mixer in a preferably fixed position, is effected by means of a Wheatstone bridge, wherein $$R_1 R_4 = R_2 R_3.$$

If, when using particular types of mixers such as gyroscopic mixers, the plate on which is mounted the movable cross-member 4 on which the strain gauge 8 is connected should have general capacities of rotation with respect to the fixed structure on which the electronic circuit is mounted, it is possible to use an electrical connection between the strain gauge and the electronic circuit which employs, as well as conductor wires, sliding contacts or uncoupled electrical signal transmitting means, such as optical or radio transmitting and receiving systems, or those of another type known to experts in the field.

When using the mixer, a container of fluid products to be mixed is placed on the lower plate 2. The motor unit 5 is then actuated, which causes the upper plate 3 to move downwards, in the direction of the upper face of the container. Preferably, a system for detecting the position of the upper plate 2 supplies to the electronic circuit information on the position of the upper plate 3, for example by detecting by means of an encoder or similar device the number of revolutions performed by the motor unit 5.

When the upper plate 3 touches the upper face of the container of fluid products, the continued action of the motor unit 5 effects progressive clamping of the container and, consequently, owing to the vertical effort exerted by the bushes 7 on the ends of the movable cross-member 4, and to the reaction force exerted by the container, progressive flexion of the cross-member 4 in its longitudinal direction. To each value of the clamping force imposed by the motor 5 there corresponds a specific degree of flexion of the cross-member 4, to which corresponds an elongation of the strain gauge 8, to which corresponds a variation in the resistance $R_1$ of the Wheatstone bridge.

On reaching a specific threshold value of the clamping force, determined by the variation in the resistance $R_1$, the signal detected by the electronic circuit is interpreted as a signal of correct clamping of the container of fluid products. Said signal, together with the signals from any other sensors present in the mixers of known type, contributes to the general verification of the correct arrangement for use of the mixer and to the subsequent consensus for the actuation of the actual mixing phase.

A particular advantage of the present invention lies in the fact that the continuous variation in the degree of flexion of the cross-member 4, and therefore the continuous variation in the resistance $R_1$ of the Wheatstone bridge, may be kept under control by the electronic system during the entire mixing phase, with the result that any loosening of the clamping of the container below the aforesaid predetermined threshold is immediately detected and suitably dealt with by the control circuit of the machine, for example by means of an alarm warning to the operator or immediate interruption of the operation of the machine itself.

A further advantage of the present invention lies in the possibility of disposing two strain gauges 8 in proximity to the opposed ends of the cross-member 4, such as to keep under independent control the respective clamping action effected by each operating rod 6 and corresponding threaded bush 7, detecting any lack of uniformity of action of the clamping assembly 1.

In another embodiment of the present invention which has proved particularly efficient, but which should not be regarded as limitative, a strain gauge 8 has been positioned on each of the two major surfaces of the movable cross-member 4. In this way it is possible to further improve the accuracy of detection of the flexing action exerted on the cross-member 4 by the clamping assembly. In fact, the strain gauges 8 thus disposed can effect temperature compensated control, since any deformations of the metal of which the cross-member 4 is composed, caused by a variation in temperature of the cross-member 4 itself, vary uniformly the values of the resistances $R_1$ and $R_2$ of the Wheatstone bridge, maintaining unaltered the overall reading of the values provided by the strain gauge pair 8.

While the principle of the invention remains the same, the embodiments and the details of production may of course vary widely with respect to what has been described and illustrated, without thereby departing from the scope of the present invention.

What is claimed is:

1. A device for controlling the clamping of a container on a mixer for fluids of the type comprising at least one clamping assembly selectively operable for clamping a container, said container clamping assembly comprising at least two opposed plates, at least one of which is selectively movable and connected to a transversely extending cross member having opposite ends connected to a drive assembly and sensor means mounted on said cross member for directly sensing a clamping force applied to the cross member during a clamping operation and emitting a continuous signal proportional to said clamping force.

2. A device according to claim 1, wherein the sensor means is comprised of at least one strain gauge mounted on said cross member.

3. A device according to claim 3, wherein said at least one strain gauge is connected to a control circuit adapted to detect the continuous variation of values detected by the strain gauge.

4. A device according to claim 3, wherein the connection between the strain gauge and the control circuit is provided by means of a Wheatstone bridge.

5. A device according to claim 3, wherein the connection between the strain gauge and the control circuit is provided by means of a remote signal transmission.

6. A device according to claim 2, wherein said at least one plate comprises on each of the major surfaces thereof at least one strain gauge.

* * * * *